G. H. WHITEHOUSE & A. COOK.
SCREWING MACHINE.
APPLICATION FILED AUG. 17, 1917.

1,277,801.

Patented Sept. 3, 1918.
3 SHEETS—SHEET 1.

INVENTORS
George Henry Whitehouse
Albert Cook
BY
ATTORNEYS

UNITED STATES PATENT OFFICE.

GEORGE HENRY WHITEHOUSE AND ALBERT COOK, OF WEST BROMWICH, ENGLAND, ASSIGNORS TO GEORGE HENRY ALEXANDER, OF BIRMINGHAM, ENGLAND.

SCREWING-MACHINE.

1,277,801.      Specification of Letters Patent.      Patented Sept. 3, 1918.

Application filed August 17, 1917. Serial No. 186,727.

*To all whom it may concern:*

Be it known that we, GEORGE HENRY WHITEHOUSE, a subject of the King of Great Britain and Ireland, residing at Mountjoy, 5 Bratt street, West Bromwich, in the county of Stafford, England, and ALBERT COOK, a subject of the King of Great Britain and Ireland, residing at Gilwern, Phoenix street, West Bromwich, in the county of Stafford, 10 England, have invented certain new and useful Improvements Relating to Screwing-Machines, of which the following is a specification.

This invention relates to screwing machines of the type wherein the screw thread is cut by a chasing tool, and comprises means as hereinafter described for advancing the tool for the thread cutting action and for its rapid withdrawal from the work piece and return to the starting position.

Referring to the three accompanying sheets of explanatory drawings:—

The same reference letters in the different views indicate the same or similar parts.

Figure 3:
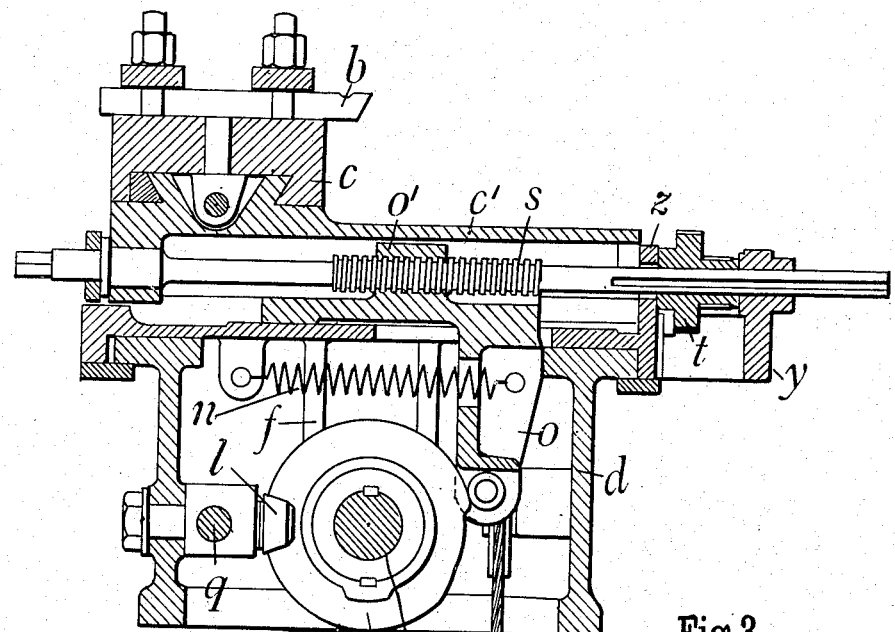
Fig. 3 is a sectional end elevation, Fig. 4 a sectional plan and Fig. 5 a sectional side elevation showing the slide rest to a larger scale than in the general views at Figs. 1 and 2.
Figure 4:
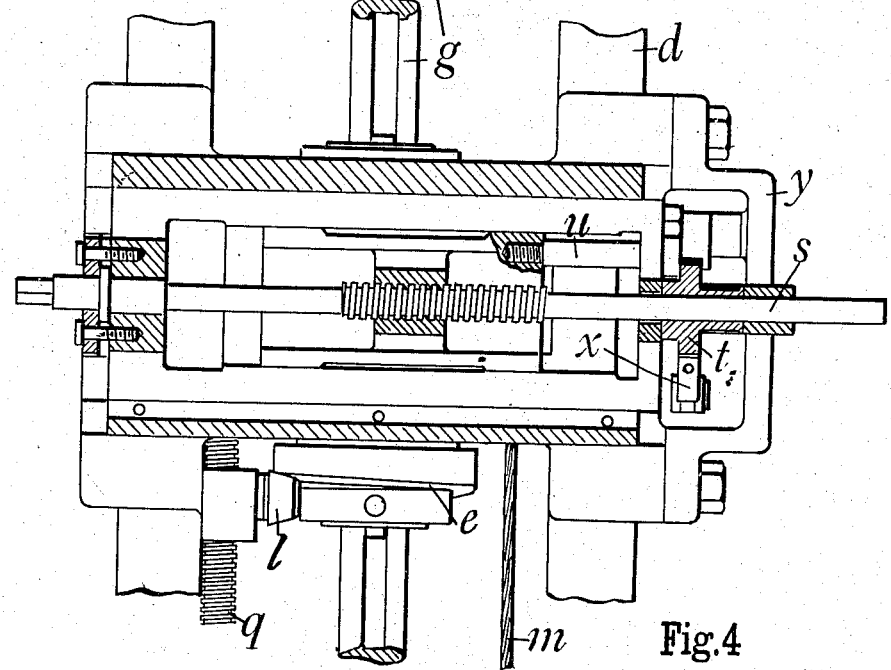
Figure 5:
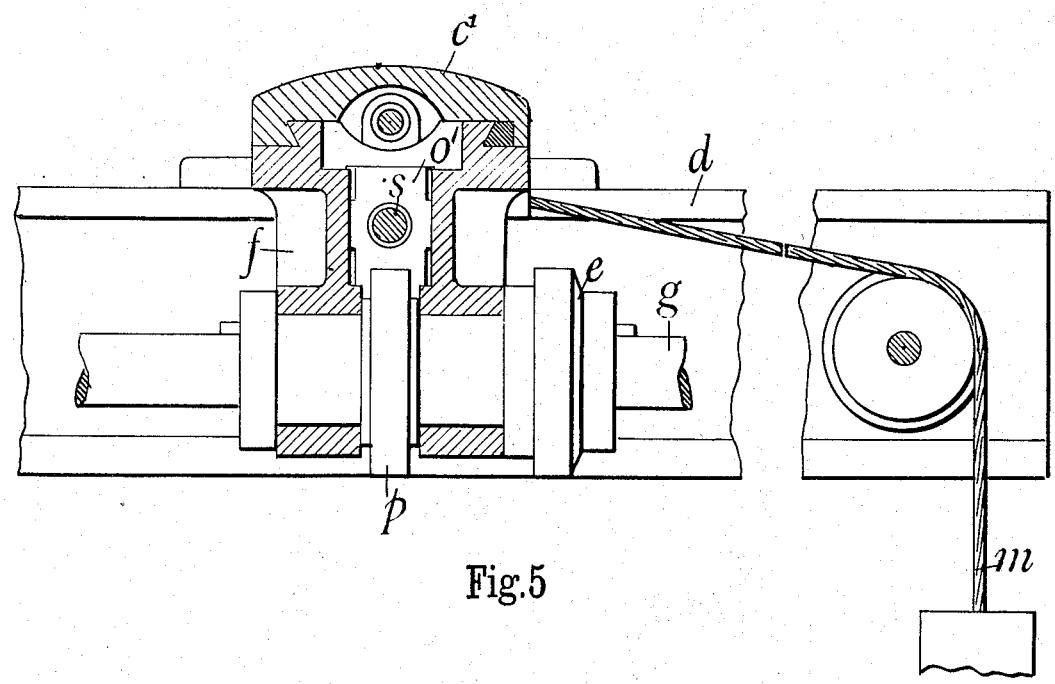
Figures 6, 7:
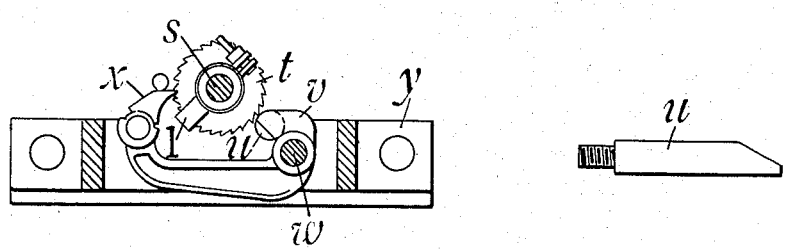
Fig. 6 is a sectional end view of the automatic feed mechanism of the slide rest.
Fig. 7 is a view showing separately the inclined tapered push bar forming a part of such mechanism.

In the application of the invention, in the manner indicated by the drawings, to the construction of a screw cutting lathe or screwing machine for the cutting of the threads on or in cast iron or other work pieces, the said work pieces are carried in any known manner by the rotating spindle forming part of the running headstock as $a$ such as is used for an ordinary lathe or like machine. The screw cutting or thread chasing tool $b$ (Fig. 3) is fixed in a slide rest $c$ carried on the bed $d$ of the machine. The said rest is of the compound or other type and is provided with screws or other means for imparting the required hand movements or adjustments of the tool relatively to the work piece.

The automatic advance of the tool $b$ for the cutting of the thread on the work piece is obtained by means of a face cam as $e$ supported by an extension $f$ from the slide rest beneath the top of the bed $d$ of the machine, and rotated by means of a spline shaft $g$ or its equivalent which is driven through change gear wheels $h, i, j, k$, from the running headstock $a$ aforesaid. During its rotation the cam $e$ presses against an abutment piece $l$ adjustably secured to the bed of the machine and by such pressure the complete rest $c$ is advanced until the chasing tool $b$ is at the end of the portion of the work piece to be screwed, at which time the active cam surface will have passed over or beyond the abutment piece. A rapid return movement of the rest, carrying the tool with it, is effected by a spring or by a weighted cord as $m$, but immediately prior to such return a quick lateral movement is imparted to the tool to withdraw it from the threads it has cut on the workpiece. Such lateral movement is imparted preferably by a spring as $n$ acting on a projection $o$ from the upper portion $o^1$ of the slide rest which is capable of lateral movement relatively to the lower or saddle portion. Prior to the next forward stroke of the slide rest the tool is returned, against the effort of the spring $n$, by the action of the peripheral cam $p$ mounted on the aforesaid spline shaft $g$.

By varying or changing the aforesaid change gear wheels $h, i, j, k$, through which the spline shaft $g$ is driven from the headstock $a$, and by changing the face cam $e$, screw threads of any desired pitch may be cut on the work pieces.

Figure 1:
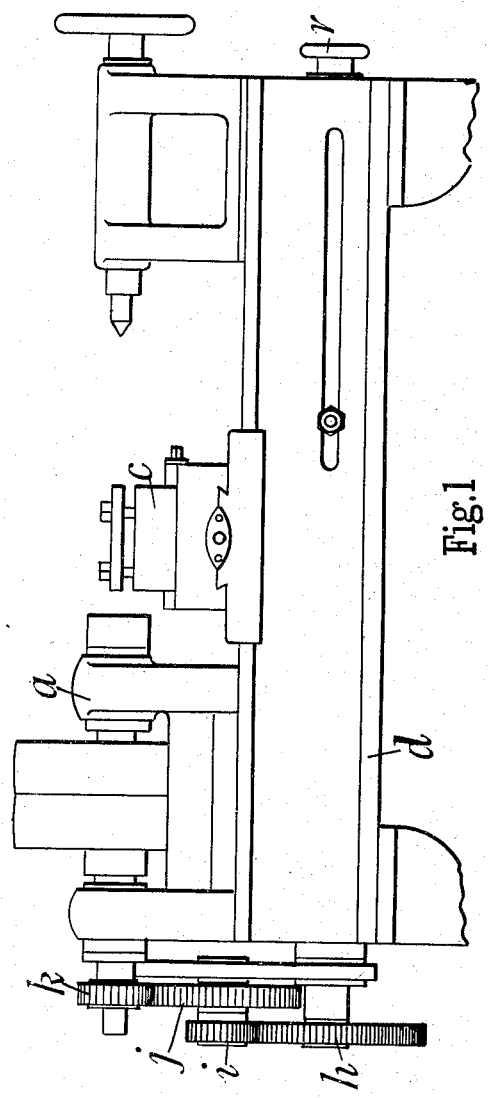
Figure 1 is an elevation and Fig. 2 a plan representing a screw cutting lathe or screwing machine having this invention applied thereto.
Figure 2:
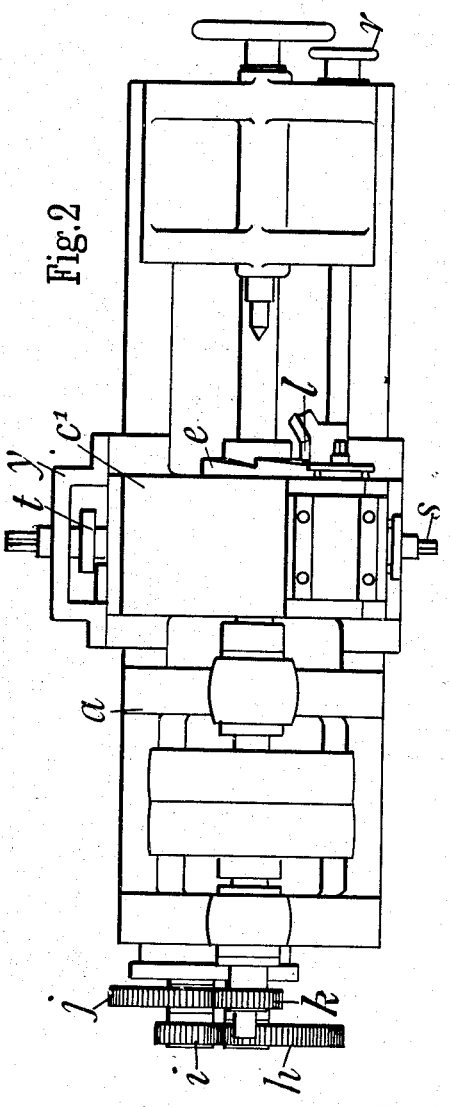

The adjustment of the abutment piece $l$ aforesaid may be effected by means of a screw $q$, operated by a hand wheel $r$ (Figs. 1 and 2) or otherwise. The said screw can serve also as a strut to prevent or assist in preventing a movement of the abutment piece when the machine is in operation.

For imparting feeding movement to the tool $b$ on each reciprocation of the slide rest, under the combined action of the face cam $e$ and the weighted cord $m$ the portion $c^1$ of the slide rest has the inner part $o^1$ connected to it by the screw spindle *s*. Such spindle may be rotated by hand, but for the automatic feed movements of the tool *b*, a ratchet wheel *t* is mounted on the spindle and in spline connection therewith. On the quick lateral movement of the slide rest to withdraw the tool from the work, by the action of the spring *n* as hereinbefore described, the inclined or tapered outer end of the push bar *u* which is secured to and moves with the portion *c¹* of the slide rest, engages the short arm of the lever *v* and slightly rocks the same upon its pivot *w*. By such rocking of the lever the pawl *x* which it carries engages and imparts a slight rotary movement to the ratchet wheel *t*, and as such wheel is prevented from endwise movement by the projections *y* and *z* from the lower or saddle part of the slide rest, the upper portion of the rest with the tool *b* is moved sufficiently to feed the tool toward the workpiece in readiness for the next cutting or screw chasing stroke under the action of the face cam *e*. During such stroke the rocking lever *v* falls or returns by gravity to effect the withdrawal of the pawl. Limitation of the extent of the automatic feed movements is provided for by the adjustable stop piece *l* which is clamped to the ratchet wheel *t* in such a position as will trip the pawl, after the required feed movements have been imparted to the wheel. Thus the continuance of the reciprocations of the slide rest after the threads have been cut to the required depth on the work piece, will not result in any cutting beyond such depth.

Having thus described our invention what we claim as new and desire to secure by Letters Patent is:—

1. In screw thread chasing machines consisting in part of a running headstock rotating the work piece and a slide rest carrying the thread chasing tool, the combination with the said rest of a rotating cam, an abutment from which the said cam presses forward the slide rest, means for returning the slide rest toward the abutment, and means for the automatic withdrawal of the said tool from contact with the work piece and its subsequent return thereto, as set forth.

2. In screw thread chasing machines consisting in part of a running headstock rotating the work piece and a slide rest carrying the thread chasing tool, the combination with the said rest, of a rotating cam, an abutment from which said cam presses forward the slide rest, means for adjusting the position of the said abutment, means for returning the slide rest toward the abutment, and means for the automatic withdrawal of the said tool from contact with the work piece and its subsequent return thereto, as set forth.

3. In screw thread chasing machines, the combination with a running headstock rotating the work piece, of a slide rest carrying the thread chasing tool and having relatively movable upper and lower parts, a yielding connection between said parts, means for imparting a movement to the upper part relatively to the lower part in opposition to the said yielding connection, a rotating cam, an abutment from which the said cam presses forward the slide rest, means for returning the slide rest toward the abutment, and means for the automatic withdrawal of the said tool from contact with the work piece and its subsequent return thereto, as set forth.

4. In screw thread chasing machines, the combination with a running headstock, rotating the work piece, of a slide rest carrying the thread chasing tool and having relatively movable upper and lower parts, a yielding connection between said parts, means for imparting a movement to the upper part relatively to the lower part in opposition to the said yielding connection, means for imparting automatic feed movements to the said tool, a rotating cam, an abutment from which the said cam presses forward the slide rest, means for returning the slide rest toward the abutment, and means for the automatic withdrawal of the said tool from contact with the work piece and its subsequent return thereto, as set forth.

In testimony whereof we have signed our names to this specification.

GEORGE HENRY WHITEHOUSE.
ALBERT COOK.